United States Patent [19]

Faye

[11] 4,225,832

[45] Sep. 30, 1980

[54] SELF-ADAPTING EQUALIZER

[75] Inventor: Jean-Claude Faye, Villebon, France

[73] Assignee: Compagnie Industrielle des Telecommunications Cit-Alcatel, Paris, France

[21] Appl. No.: 955,838

[22] Filed: Oct. 30, 1978

[30] Foreign Application Priority Data

Nov. 30, 1977 [FR] France .............................. 77 36094

[51] Int. Cl.$^2$ ............................................. H04B 3/10
[52] U.S. Cl. ....................................... 333/16; 333/18; 333/166; 364/825; 375/14
[58] Field of Search .......................... 333/16, 18, 166; 325/42, 323; 179/15 BP

[56] References Cited

U.S. PATENT DOCUMENTS

| | | | |
|---|---|---|---|
| 3,422,222 | 1/1969 | Lord | 178/69 |
| 3,508,172 | 4/1970 | Kretzmer et al. | 333/18 |
| 3,659,229 | 4/1972 | Milton | 333/18 |
| 3,845,390 | 10/1974 | De Jager et al. | 325/42 |
| 3,868,603 | 2/1975 | Guidoux | 333/18 |

*Primary Examiner*—Paul L. Gensler

*Attorney, Agent, or Firm*—Sughrue, Rothwell, Mion, Zinn and Macpeak

[57] ABSTRACT

A control signal x(t) of known characteristics is transmitted over a transmission channel (1) together with a useful signal y(t). The equalizer comprises essentially: a local generator (5) for generating a control signal which is identical with the transmitted control signal and in phase with the control signal component x'(t) as received at the equalizer; a filter circuit (6) for substantially isolating the control signal component X"(t) from the received signal (y'(t)+x'(t)), a first non-recursive self-adapting transversal filter for synthesising the reciprocal of the transfer function of the transmission channel (1) in response to the locally generated control signal x(t) and the isolated control signal component x"(t); a second transversal filter (9) having the same structure and using the same weighting coefficients as the first transversal filter; and a subtractor for subtracting the isolated control signal component x"(t) from the received signal to produce an approximation y"(t) of the useful signal, which approximation it supplies to the second transversal filter (9) to obtain a substantially equalized useful signal ŷ(t). This circuit uses two transversal filters where previously it has been necessary to use three.

6 Claims, 4 Drawing Figures

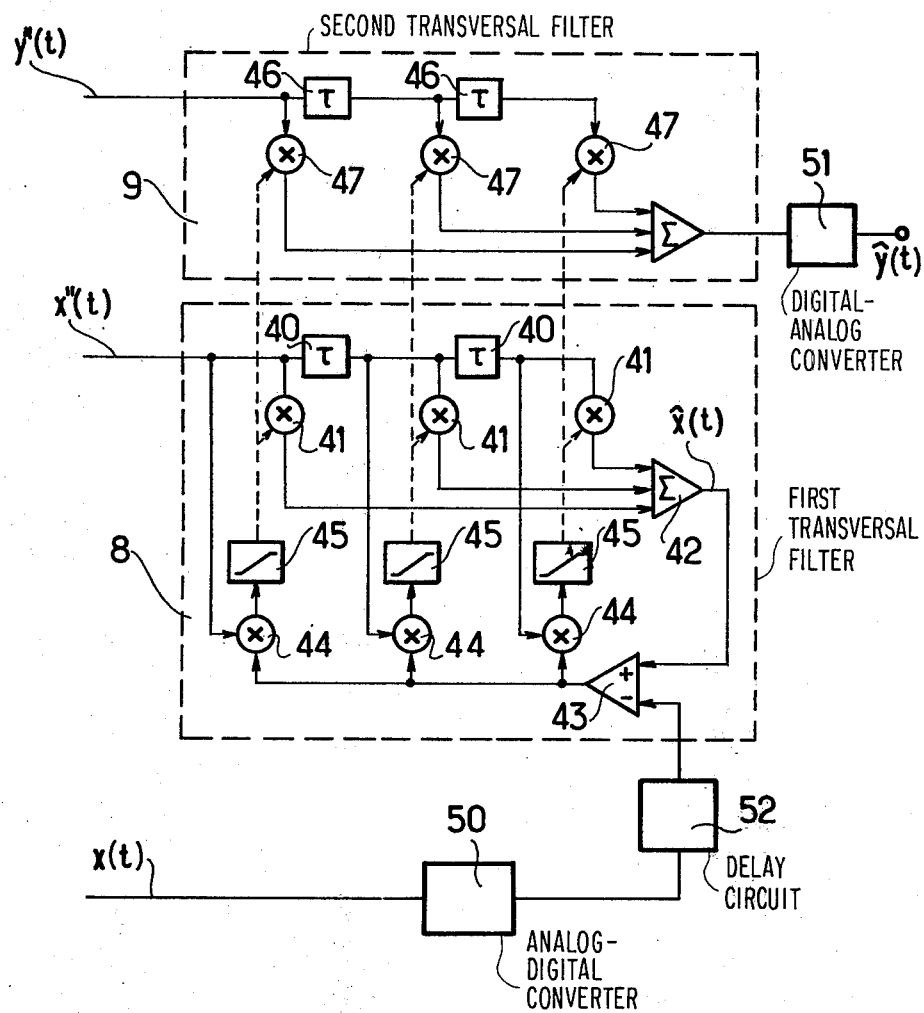

SELF-ADAPTING EQUALIZER

FIELD OF THE INVENTION

The present invention is concerned with transmission techniques.

BACKGROUND OF THE INVENTION

This specification is concerned with equalisation in the sense of the compensation of amplitude and group delay time distortion of transmitted signals introduced by the transmission channel. This equalisation technique is mainly used for digital transmission over telephone circuits. Equalisation is effected by connecting at the reception end of the transmission channel a correcting circuit known as an equaliser with a transfer function which is as close as possible to the reciprocal of that of the transmission channel, so that the overall response characteristic is linear in phase and amplitude over the frequency band occupied by the transmitted signals. The correction circuit is generally self-adapting, its transfer function changing with time to take account of variations in the characteristics of the transmission channel. These circuits often use transversal filters in which the overall response of a filter element is synthesized as the weighted sum of the partial responses obtained at intermediate taps of a cascade-connected impedance array. The self-adapting function is obtained by causing the weighting coefficients to converge to optimum values for which the equaliser output signal bears the closest relationship to the transmitted signal. Convergence is obtained by means of an error signal based on various criteria well known to those skilled in the art, in particular the forced zero, hybrid and least mean-squared error criteria. The error signal must be representative of the differences between the waveforms of the transmitted signal available at the output of the equaliser and the estimated or known waveform of the signal at the transmission end. One method of generating the error signal consists in deducing the distortion imposed during transmission by means of a control signal which is superposed on the useful signal and of a form which is known at the reception end.

The present invention relates to a self-adapting line equaliser using transversal filters with controlled weighting coefficients, for use on a transmission channel carrying a useful signal and a superposed control signal.

A prior art filter of this type comprises:

a local generator supplying a control signal identical to that applied to the transmission channel, synchronized with the control signal received over the transmission channel and mixed with the useful signal, a first transversal filter with controlled coefficients synthesizing the transfer function of the transmission channel on the basis of a comparison of the locally generated control signal and the signal obtained from the transmission channel, the first transverse filter also separating the useful signal from the control signal, a second transversal filter with controlled coefficients synthesizing the reciprocal of the transfer function of the transmission channel on the basis of a comparison of the output signal of the first transversal filter and the locally generated control signal, and a third transversal filter with the same coefficients as the second and having its input connected to receive the error signal of the first transversal filter.

A disadvantage of this type of equaliser is its relative complexity, the equaliser comprising three transversal filters. The need for a high signal/noise ratio for the useful signal at the output of the first transversal filter (for example, not less than 40 dB) means that the transmission level of the control signal must be very much lower than that of the useful signal. This makes it difficult to synchronize the local control signal generator.

The present invention is intended to provide a self-adapting equaliser of simple design operating with a control signal input level comparable with that of the useful signal whilst supplying at its output a useful signal in which the noise content due to the control signal is low.

SUMMARY OF THE INVENTION

The present invention consists in a self-adapting equaliser for connection to the reception end of a transmission channel receiving at the transmission end a useful signal $y(t)$ and a control signal $x(t)$ of a period T superposed on the useful signal and of a form which is known at the reception end, the equaliser supplying at the reception end a distorted signal with a component $y'(t)$ corresponding to the useful signal $y(t)$ and a component $x'(t)$ corresponding to the control signal $x(t)$, said equaliser comprising:

a local generator supplying a control signal identical to the control signal $x(t)$ applied to the transmission channel at the transmission end and received in the distorted form $x'(t)$ mixed with the distorted form $y'(t)$ of the useful signal, said control signal being synchronised with said signal $x'(t)$;

a filter circuit receiving the signal $y'(t)+x'(t)$ from the reception end of the transmission channel and providing at its output the mean value of this input signal and $(n-1)$ previous input signals sampled at intervals spaced by the period T of the control signal $x(t)$;

a first non-recursive transversal filter comprising a cascade-connected impedance array with intermediate taps, with its input connected to receive the signal $x''(t)$ provided by the filter circuit and having its weighting coefficients controlled so as to minimise the correlation functions of the signals at the intermediate taps and the signal which is the difference between its output signal $\hat{x}(t)$ and the control signal $x(t)$ supplied by the local generator a subtractor circuit receiving on an additive first input the signal $y'(t)+x'(t)$ obtained at the reception end of the transmission channel and on a subtractive second input the signal $x''(t)$ supplied by the filter circuit, and providing at its output a signal $y'(t)+x'(t)-x''(t)$ equal to the difference between the two signals applied to its inputs; and a second transversal filter with the same cascade-connected impedance array and the same weighting coefficients as the first transversal filter, receiving on its input the output signal of the subtractor circuit and providing at its output the equalised useful signal $\hat{y}(t)$.

Other features and advantages of the invention will emerge from the accompanying claims and the following description of one embodiment of the invention given by way of example only. The invention will be described with reference to the accompanying drawings.

BRIEF DESCRIPTION OF THE DRAWINGS

FIG. 4 is the block diagram of the transversal filters used in the self-adapting equaliser shown in block schematic form in FIG. 1.

DESCRIPTION OF THE PREFERRED EMBODIMENT

Figure 1:
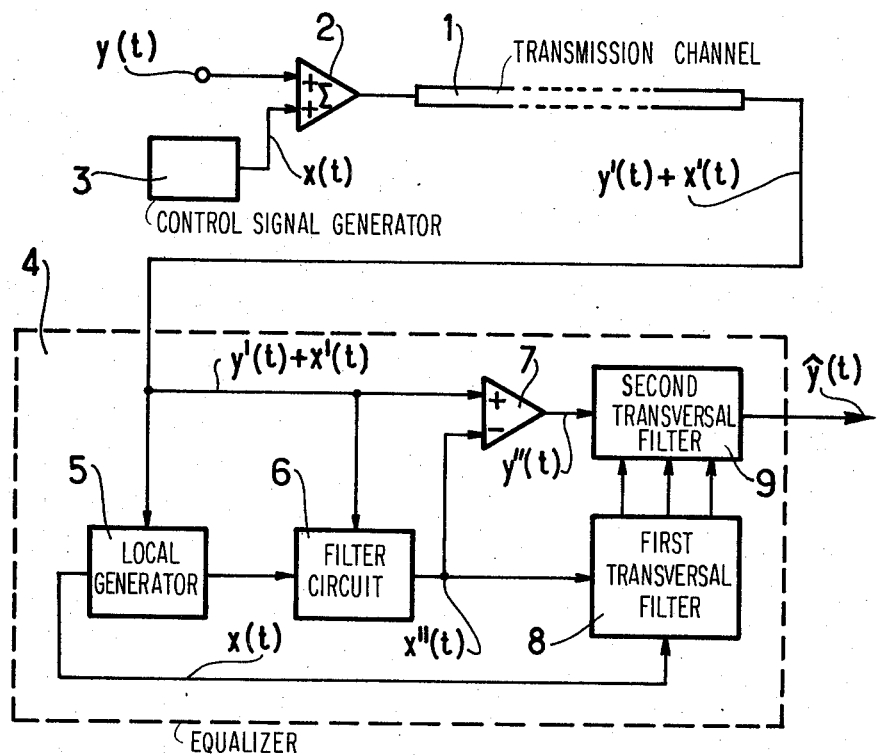
FIG. 1 is the block diagram of a self-adapting equaliser in accordance with the invention and the associated transmission connection.

FIG. 1 shows a transmission channel 1 connecting a transmission point to a reception point. At the transmission end, the transmission channel 1 is connected to the output of a summing circuit 2 which receives the useful signal y(t) to be transmitted and a periodic control signal x(t) provided by a generator 3. At the reception end, it is connected to a self-adapting equaliser 4 in accordance with the invention. At the transmission end, the input to the transmission channel 1 receives a signal y(t)+x(t), its output supplying, at the reception end, a signal y'(t)+x'(t), which is a distorted image of the first-mentioned signal.

The self-adapting equaliser 4 separates the signals y'(t) and x'(t) and generates from the signal y'(t) a signal ŷ(t) which is very similar to the signal y(t), on the basis of the distortion of the signal x(t) imposed by the transmission channel 1 and detected by comparing the signals x(t) and x'(t). The self-adapting equaliser basically comprises:

a local generator 5 supplying a control signal identical to the control signal x(t) produced at the transmission end by the generator 3 and therefore also referred to as control signal x(t), this locally generated control signal being synchronized with the distorted signal x'(t) mixed with the distorted useful signal y'(t) received via the transmission channel 1, a filter circuit 6 capable of isolating a signal x"(t) very similar to the signal x'(t) contained in the signal x'(t)+y'(t) received via the transmission channel, by a summation process executed over successive periods of the same duration as the period of the control signal x(t), a subtraction circuit 7 capable of isolating a signal y"(t) very similar to the signal y'(t) contained in the signal x'(t)+y'(t) received via the transmission channel 1, a first transversal filter 8 with controlled coefficients synthesizing the reciprocal transfer function (apart from a delay) of the transmission channel 1 by comparing the signal x"(t) supplied by the filter circuit 6 with the control signal x(t) supplied by the local generator 5, and a second transversal filter 9 of similar design to the first transversal filter 8 and with the same weighting coefficients, executing the equalisation function proper, that is to say the conversion of the signal y"(t) supplied by the subtraction circuit 7 into a signal ŷ(t) closer in form to the transmitted useful signal y(t).

The control signal x(t) supplied by the generator 3 and added to the useful signal y(t) before this is applied to the transmission channel 1 is a periodic signal of arbitrary form and not correlated with the useful signal y(t). Its frequency spectrum preferably extends over the whole of the frequency band occupied by the transmitted signal y(t), so that the distortion to which it is subjected during its propagation along the transmission channel 1 is representative of the response of the latter over the whole range of frequencies of the useful signal y(t). A pseudo-random bipolar signal may be used, for example, and may be obtained from a pseudo-random binary sequence.

Figure 2:
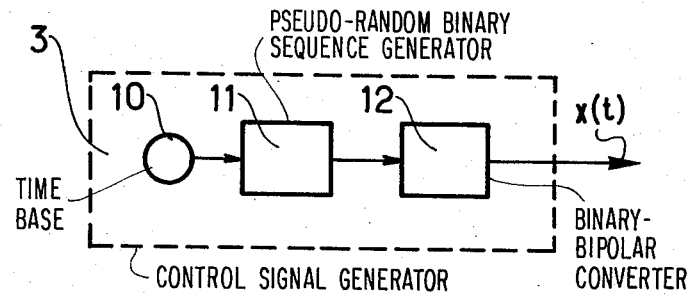
FIG. 2 is a more detailed block diagram of a control signal generator as used at the transmission end of the connection.

FIG. 2 is the block diagram of one form of the generator 3 used at the transmission end to generate a control signal x(t) of the aforementioned type. Referring to FIG. 2, a timebase 10 controls the output of a pseudo-random binary sequence generator 11 whose output is connected to the input of a binary-bipolar converter 12. The units shown in this figure are not shown in more detail as they are all of well-known types. The pseudo-random binary sequence generator 11 may be based on a shift register with its input looped to its output and to the outputs of certain stages by modulo 2 adding circuits. The binary-bipolar converter converts the 0 state of the binary signal to the 0 state of a three-state signal and the 1 state of the binary signal to alternate +1 and −1 states of the three-state signal.

The three-state (bipolar) signal obtained in this way is also known as an Alternate Mark Inversion (AMI) signal. It is in widespread use for the transmission of digital signals, the second half of the three-state digit being constantly reset to zero.

Figure 3:
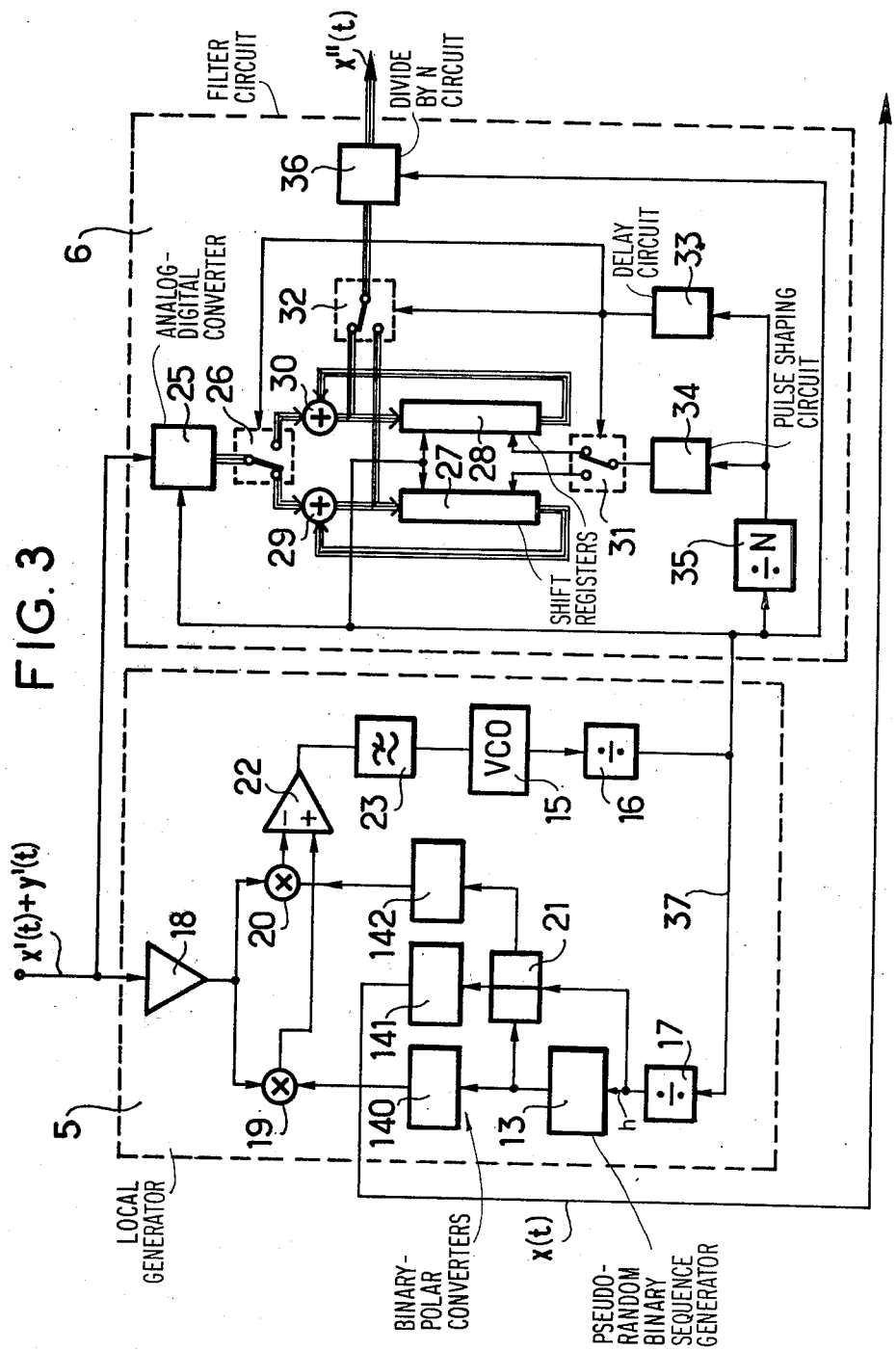
FIG. 3 is a block diagram showing the local control signal generator and the filter circuit used in the self-adapting equaliser shown in block schematic form in FIG. 1.

FIG. 3 is a more detailed block schematic of one embodiment of the local generator 5 and the filter circuit 6 of the self-adapting equaliser shown in FIG. 1.

Referring to FIG. 3, the local generator 5 produces a control signal x(t) identical to that supplied by the generator 3 shown in FIG. 2, synchronized with the distorted control signal x'(t) obtained from the transmission channel 1 with the distorted useful signal y'(t). Like the generator 3 shown in FIG. 2, the local generator 5 comprises a pseudo-random binary sequence generator 13 connected to a binary-bipolar converter 140. It further comprises a two-stage shift register 21 whose "data" input is connected to the output of generator 13, the outputs of the first and second stages being connected to two other binary-bipolar converters 141 and 142. The pseudo-random binary sequence generator 13 is controlled by a clock signal h obtained from a voltage-controlled oscillator 15 through two frequency divider circuits 16 and 17 connected in cascade. The shift register 21 is also controlled by the clock signal h. Each stage of this shift register introduces a delay equal to one half-period a of the signal h. To achieve this, as the signal h has a cyclic ratio of 1/2, the "clock" input of the second stage of this register receives the signal h and the "clock" input of the first stage receives the inverted clock signal h̄ provided by an inverter (not shown).

The total division ratio of the divider circuits 16 and 17 is selected so as to obtain, at the mean frequency of the voltage-controlled oscillator 15, an operating speed for the pseudo-random binary sequence generator 13 which is very close to that of the pseudo-random binary sequence generator 11 at the transmission end. The voltage-controlled oscillator 15 is controlled by a phase-locked loop which enables the locally generated signal x'(t) to be synchronized with the signal x'(t) mixed with the transmitted signal y'(t) available at the output of the transmission channel 1.

It follows from the above that three versions of the control signal x(t), with various time shifts, are available at the outputs of the three binary-bipolar converters, the versions at the outputs of converters 140 and 142 being respectively ahead of and behind that supplied by the converter 141. The version supplied by the converter 141 constitutes the output signal of the generator 5, the versions provided by converters 140 and 142 being used in the above-mentioned phase-locked loop.

The phase-locked loop comprises:

a limiter amplifier 18 with its input connected to the input of the self-adapting equaliser, a first multiplier circuit 19 having one input connected to the output of the limiter amplifier 18 and its other input connected to the output of the binary-bipolar converter 140.

a second multiplier circuit 20 having one input connected to the output of the limiter amplifier 18 and the other connected to the output of the binary-bipolar converter 142, a subtraction circuit 22 having an additive input connected to the output of the first multiplier circuit 19 and a subtractive input connected to the output of the second multiplier circuit 20, and a low-pass filter 23 connected to the output of the subtraction circuit 22 with its output connected to a control input of the oscillator 15.

The limiter amplifier 18 converts the signal $x'(t)+y'(t)$ obtained from the transmission channel 1 to a two-level signal corresponding to the $+1$ and $-1$ states of the bipolar code.

The multiplier circuits 19 and 20 and the subtraction circuit 22 may be based on logic circuits. The multiplier circuit 19, considered independently of the multiplier circuit 20 and the subtraction circuit 22, operates in conjunction with the low-pass filter 23 to compute the correlation function of the signal x(t) from the binary-bipolar converter 140 with the signal x(t) obtained from the transmission channel in the form of the signal $x'(t)$ mixed with the signal $y'(t)$. This function is analogous to the autocorrelation function of the signal $x'(t)$, as the latter represents the signal x(t) as distorted by the transmission channel, the signal x(t) not being correlated with the signal $y'(t)$. The multiplier circuit 20, considered independently of the multiplier circuit 19 and the subtraction circuit 22, operates in conjunction with the low-pass filter 23 to compute the same correlation function, but in this instance delayed by two time intervals a because the computation is based on the signal x(t) obtained from the binary-bipolar converter 142. By superposition, the subtraction circuit 22 provides a voltage-phase shift response at the output of the low-pass filter 23 which is similar to that of a conventional phase detector. The output voltage of the low-pass filter 23 is zero when the pseudo-random bipolar sequence x(t) at the output of the binary-bipolar converter 141 is synchronized with the distorted form $x'(t)$ obtained from the transmission channel 1 mixed with the transmission signal $y'(t)$. As the relative phase of the sequence x(t) at the output of the binary-bipolar converter 141 relative to the signal $x'(t)$ in the output signal of the transmission channel tends to a time interval close to a, by means of a delay or an advance, the output voltage of the low-pass filter 23 tends to a maximum or minimum value, respectively. By using a voltage-controlled oscillator whose frequency increases with increasing control voltage amplitude, it is possible to obtain a point of stable equilibrium for the phase control function such that the pseudo-random bipolar sequence x(t) at the output of the binary-bipolar converter 141 is synchronized with the signal $x'(t)$ contained in the output signal from the transmission channel 1.

The phase-locked loop locks on as soon as the phase shift between the pseudo-random sequence x(t) at the output of the binary-bipolar converter 141 and the signal $x'(t)$ at the output of the transmission channel is less than a time interval of around 2a, by an advance or by a delay. An initial synchronization circuit is included to set operating conditions in the lock-on area. This may operate, for example, by marking at the reception end the first rising edge of the pseudo-random binary sequence transmitted, in order to trigger local generation of the signal x(t).

In the prior art self-adapting regulator mentioned above, the signals $y'(t)$ and x(t) were separated using a self-adapting transversal filter. To obtain adequate separation (e.g. 40 dB) it is necessary in this prior art regulator to transmit the control signal x(t) at a level 20 dB below that of the useful signal y(t), which made the synchronization of the control signal supplied by the local generator with the signal $x'(t)$ obtained from the transmission channel with a noise $y'(t)$ at a level greater than 20 dB a long and difficult process. The filter circuit used in the self-adapting equaliser in accordance with the present invention avoids this problem in that it provides better separation of the signals $y'(t)$ and $x'(t)$, enabling the level of the control signal x(t) relative to the level of the useful signal y(t) to be increased. As will be demonstrated later, these two levels can be of approximately the same magnitude, considerably facilitating the synchronization of the local generator 5 and enabling a much lower time constant to be used for the low-pass filter 23.

The filter circuit 6 shown in FIG. 1 receives the signal $x'(t)+y'(t)$ from the transmission channel 1 and provides at its output an average value derived from this input signal and $(n-1)$ previous input signals sampled at intervals spaced by the period T of the control signal x(t). The signal $x'(t)$ has the same period as the control signal x(t), so that voltage addition occurs and the average value is equal to the signal itself. On the other hand, the distorted useful signal $y'(t)$ does not have the same period as the control signal x(t), so that power addition occurs and the average value is equal to the signal itself attenuated by a factor equal to $(\sqrt{n})/n$. The level of the distorted control signal $x'(t)$ at the output of the filter circuit 6 is therefore increased in the ratio $\sqrt{n}$ relative to the level of the distorted useful signal $y'(t)$. If the summation process is applied $10^4$ times, the separation of 40 dB of the previously discussed example is obtained.

The filter circuit 6 shown in FIG. 3 is of digital type. It includes:

a parallel-output analogue-digital converter 25 with its "data" input connected to the input of the self-adapting equaliser and its "clock" input connected to an intermediate output of the local generator 5, namely the output of the divider circuit 16, a first inverter 26 having a multiple input connected to the "data" output of the analogue-digital converter 25 and two multiple outputs, its input connecting to one or other set of outputs (the "parallel" input and output connections are shown schematically in the figure by three parallel lines), two identical data processing circuits, each comprising a shift register 27, 28 with a data input, a data output, a clock input connected in parallel to the clock input of the analogue-digital converter 25, and a reset input, each data processing circuit also including a two-input parallel adder 29, 30 with one input connected to an output of the first inverter 26 and the other input connected to the data output of the shift register 27, 28, the adder output being connected to the input of the shift register 27, 28, a second inverter 31 comprising an input and two outputs connected to the reset inputs of respective shift registers 27 and 28, a third inverter 32 with two multiple inputs connected to the data inputs of shift registers 27 and 28 and a multiple output, a delay circuit 33 having its output connected to control inputs of the first, second and third inverters 26, 31 and 32, a pulse shaping circuit 34 with its output connected to the input of the second inverter 31, a divide by N circuit 35 with its input connected in parallel to the clock input of the analogue-digital converter 25 and, via a connection 37, to the output of frequency divider 16 of the local generator 5, its output being connected to the inputs of circuits 33 and 34, and a divide by N circuit 36 with a multiple input connected to the output of the third inverter 32, a clock input connected in parallel to the clock input of the analogue-digital converter 25, and an output constituting that of the filter circuit 6.

The number N is equal to the product $n \times r$, where n is the number of elements in the sequence of samples spaced by the period T used to calculate the average value and r is the number of samples input to the analogue-digital converter 25 during a period T. As the number r of samples obtained during a period T must be constant, the sampling frequency of the analogue-digital converter 25 is supplied by the voltage controlled oscillator of the local generator 5, via a frequency divider 16 with a fixed division ratio.

The parallel output of the analogue-digital converter 25 comprises a number of buses on which the various digits of the sampled value are available in parallel form. These buses are connected to those of the multiple input of the first inverter 26, which is based on logic circuits and connects the output buses of the analogue-digital converter 25 either to those of an input to the adder circuit 29 or to those of an input to the adder circuit 30.

The adder circuits 29 and 30 are parallel adders providing for sufficient digits for n iterative additions of the highest output value obtainable from the analogue-digital converter 25. The shift registers 27 and 28 comprise as many parallel lines as the outputs of adders 29 and 30. The shift registers comprise $r+1$ individual registers, the additional unit being required because the first and last registers have the same content.

The third inverter 32 has two multiple inputs each with as many parallel lines as the outputs of adders 29 and 30 or the data inputs of shift registers 27 and 28. It connects the outputs of adders 29 and 30 alternately to the input of the parallel divide by n circuit 36. It is based on logic circuits of the selector multiplex type.

The delay circuit 33 and the shaping circuit 34 may be based on monostable flip-flops.

In order to explain the operation of the filter circuit 6, it is first assumed that the data processing circuit comprising shift register 27 has arrived at the end of its read phase and that the other data proccessing circuit, including shift register 28, has arrived at the end of its write phase. If this is the case, the first inverter 26 switches the output of the analogue-digital converter 25 to the input of adder 30, the second inverter 31 switches the output of the shaping circuit 34 to the reset input of the shift register 27, and the third inverter 32 switches the output of adder 29 to the input of the divide by n circuit 36. The divide by N circuit 35 outputs a pulse coinciding with the next sampling instruction transmitted via line 37. This causes shift registers 27 and 28 to advance by one step, and a pulse to appear at the output of circuit 35. The rising edge of this pulse triggers a short output pulse from the shaping circuit 34 which clears the shift register 27. The same rising edge, after a certain delay relative to the clearing of shift register 27, also triggers a short output pulse from the delay circuit 33 which switches over the first, second and third inverters 26, 31 and 32. The first inverter 26 then connects the output of the analogue-digital converter 25 to the input of adder 29, the second inverter 31 connects the output of the shaping circuit 34 to the reset input of the shift register 28, and the third inverter connects the input of the divider circuit 36 to the output of the adder circuit 30.

The digitised value at the output of the analogue-digital converter 25 is loaded into the first stage of the shift register 27 via the adder circuit 29 which receives a zero value on its other input. The loading of the digitised values of the samples obtained at the output of the analogue-digital converter 25 continues for the next $(r-1)$ sampling instructions received via line 37, so that after receipt of r sampling instructions the shift register 27 is loaded with the values of the r samples in a segment of the self-adapting equaliser input signal of duration T, the last stage of this register being in the zero state.

The next sampling instruction causes shift register 27 to advance by one step, so that the value of the first sample appears in its final stage. This value is added to that of the $(r+1)$th sample at the output of the analogue-digital converter 25 in adder circuit 29, before being written into the first stage of the shift register 27. On the $(r+2)$th sampling instruction, the value of the second sample appears in the final stage of shift register 27, and is added to that of the $(r+2)$th sample obtained from the output of the analogue-digital converter 25 before being written into the first stage of the shift register 27. This sequence is repeated for the following $(r-2)$ sampling instructions, so that after 2r sampling instructions the shift register 27 is loaded with $(r+1)$ values, the last of which corresponds to the value of the rth sample and the remaining r values, taken in the reverse order to those of the stages of the shift register 27, correspond to the term by term sum of the sequences of sample values of two consecutive sequences with duration T of the self-adapting equaliser input signal.

Continuing this sequence to the Nth sampling instruction, there is obtained in shift register 27 (except in its final stage) a sequence of r values which, in the reverse order to the stages of shift register 27, correspond to the term by term sum of the sample values of n consecutive sequences of the self-adapting equaliser input signal. In the sequence of r values, the components due to the signal x'(t) with period T add in terms of voltage and those due to signal y'(t) add in terms of power. It follows that in this sequence of values, the ratio of the signals x'(t) and y'(t) is modified by a coefficient of $\sqrt{n}$ in favour of the signal x'(t).

At the (M+1)th sampling instruction the value stored in shift register 27 shift forward by one stage, that held in the final stage being lost. The divide by N circuit 35 outputs a pulse whose rising edge triggers a short output pulse from the signal shaping circuit 34 which clears shift register 28. After a certain delay following this clearing of shift register 28, the same rising edge triggers a short output pulse from delay circuit 33 which returns the first, second and third inverters 26, 31 and 32 to their initial states. The input of adder 29 which was connected to the output of the analogue-digital converter 25 is disconnected therefrom, and receives a zero input value. As a result, the shift register 27 is looped back on itself via the adder 29, and the value held in its final stage is written into its first stage. This value is also applied via the third inverter 32 to the input of the divide by n circuit 36. The value at the output of the divider circuit 36 is therefore equal to the average value of the first term of n consecutive sequences of samples obtained during the first N sampling instructions.

On the (N+2)th sampling instruction, the shift register 27 advances by one step so that the value at the output of divider circuit 36 is the average value of the second term of n consecutive sample sequences obtained by the first N sampling instructions.

During the following sampling instructions, as far as the 2Nth instruction, shift register 27 is read n consecutive times and there is obtained at the parallel output of divider circuit 36 a signal x''(t) of period T in digitised form, this signal being formed from the sequence of average values computed term by term from the sample sequences of n consecutive sequences of duration T of the self-adapting equaliser input signal, obtained on the first N sampling instructions. If the signal x''(t) at the output of the divider circuit 36 is truly representative of the component x'(t) of the signal x'(t)+y'(t) at the output of the transmission channel 1 which represents the control signal x(t), the variation in transmission line characteristics must be negligible during the signal processing period, which is 2 n T. A practical example set out below demonstrates that this can be achieved.

On the (2 N+1)th sampling instruction, the divider circuit 35 outputs a pulse which returns the system to the state assumed to apply at the beginning of this description of the operation of the circuit. The shift register 28 operates in a similar manner to shift register 27. It is in read mode when shift register 27 is in write mode and vice versa.

The subtraction circuit 7 of FIG. 1 has not been shown in detail as it is of a well-known type. It subtracts the signal x''(t) avalable at the output of the divider circuit 36 of filter circuit 6 from the signal x'(t)+y'(t). As the signal x''(t) is in digitised form, this subtraction operation uses the digitised form of the signal x'(t)+y'(t) available at the output of the analogue-digital converter 25 of filter circuit 6. The resulting signal y''(t), which is very similar to the signal y'(t) contained in the signal x'(t)+y'(t) received via the transmission channel, is available at the parallel outputs of the subtraction circuit 7.

FIG. 4 shows one embodiment of the transversal filter 8 which synthesizes the reciprocal transfer function of the transmission channel and the transversal filter 9 which carries out the equalisation proper. For simplicity, "parallel" connections are shown as single lines.

The transversal filter 8 includes a delay line 40, only two stages of which are shown in the diagram, a set of multiplier circuits 41 (three of these being shown in the diagram) for allocation of weighting coefficients to the signals at the input, output and intermediate taps of the delay line 40, a summing circuit 42 forming the weighting sum of the aforementioned signals, and a weighting coefficient control circuit. The output signal s(t) of the transversal filter as a function of its input signal m(t) may be expressed by the equation:

$$s(t) = \sum_{k=0}^{P} C_k \Gamma_k(t) = \sum_{k=0}^{P} C_k m(t - k\tau)$$

In the above equation, 0, 1, 2, ... P designate the taps of the delay line 40, from its input towards its output, $\Gamma_0(t), \Gamma_1(t), \ldots \Gamma_P(t)$ are the signals at these taps, $C_0, C_1, \ldots C_P$ are the weighting coefficients applied to these signals by the multipliers 41, and $\tau$ is the delay applied by each stage of delay line 40. The equation shows that the transversal filter effects the convolution of the input signal m(t) and the impulse response of the circuit to be synthesized.

It is known to synthesize the reciprocal transfer function of a transmission channel on the basis of the transmitted signal e(t) and the distorted signal r(t) received over the transmission channel, using a transversal filter which receives the signal r(t) at its input and whose weighting coefficients are adjusted to provide the signal e(t) at its output, possibly subject to a delay. The weighting coefficients are adjusted so as to minimise the correlation functions of the signals $\Gamma_k(t)$ at the intermediate points on the delay line 40 and an error signal representing the difference between the transversal filter output signal and the required signal e(t). The mean-squared error E the filter output signal s(t) relative to the required signal e(t) is given by the equation:

$$E = \int_{-\infty}^{+\infty} (s(t) - e(t))^2 dt = \int_{-\infty}^{+\infty} \left( \sum_{k=0}^{P} C_k \Gamma_k(t) - e(t) \right)^2 dt$$

It can be shown that E is a convex function of the coefficients $C_k$ whose minimum value is obtained when the set of partial derivatives $\partial E/\partial C_k$ have null values. It can be shown that these partial derivatives are, ignoring a multiplication factor, the correlation functions of the error signal s(t) - e(t) and the signals $\Gamma_k(t)$ available at the intermediate points of the delay line 40.

There are various known methods for causing the weighting coefficients of a transversal filter to converge to the vaues for which the above-mentioned correlation functions cancel out, including the method of least squares, the hybrid method, and the forced zero method.

In the case of the transversal filter 8 shown in FIG. 4, the input signal is the signal x''(t) obtained at the output of filter circuit 6 and the required signal is the signal x(t) supplied by the local generator 5. The signal x(t) is digitised by an analogue-digital converter 50, and applied to the subtract input of a subtract circuit 43 which receives on its add input the output signal $\hat{x}(t)$ of the transversal filter, the circuit 43 applying the error signal to the weighting coefficient control circuit. This comprises a set of multiplier circuits 44 and integrators 45 which provide the values of the various correlation functions of the error signal and the signals $\Gamma_k(t)$ available at the intermediate outputs of the delay line 40. The arrows connecting the integrators 45 to the multipliers 41 indicate that the integrator output signals are used for determining the weighting coefficients of the transversal filter. These coefficients are supplied to the multipliers 41 by update circuits (not shown) which enable the convergence algorithm used to be executed. Each new value $C_{kj}$ of a weighting coefficient $C_k$ is defined relative to the previous value $C_{kj-1}$ by the equation:

$$C_{kj} = C_{kj-1} - \alpha \int_{-\infty}^{+\infty} \Gamma_k(t)\,(s(t) - e(t))dt$$

In the above equation, $\alpha$ is a positive constant which affects the rate at which convergence is obtained.

The correction term is obtained by connecting a multiplier carrying out the weighting by $\alpha$ to the output of each integrator 45. The convergence algorithm is executed with the assistance of a memory and a summing circuit which constitute an integrator with a long time constant.

This first controlled-coefficient non-recursive transversal filter is used to synthesize the transfer function of a circuit which produces an output signal x(t) on receipt of an input signal x"(t), the weighting coefficients being controlled so as to minimise the correlation functions of the signals at its intermediate taps with the signal representing the difference between its output signal x̂(t) and the signal x(t) provided by the local generator 5. Ignoring the delay, this transfer function is the reciprocal of that of the transmission channel in the frequency band of the useful signal y(t), since the control signal x(t) occupies the whole frequency band of the signal y(t) and the signal x"(t) obtained at the output of the filter circuit 6 corresponds to the component x'(t) of the signal obtained via the transmission channel, and corresponding to the control signal x(t). Before it is applied to filter 8, the signal x(t) may be delayed by a delay circuit 52, which facilitates the synthesis operation.

The second transversal filter 9 is a time-domain non-recursive filter. Its delay line 46 is identical to that of the first transversal filter 8. Its weighting coefficients are also equal to those of the first transversal filter 8. The inputs of its weighting coefficient multipliers 47 are connected in parallel to the analogous inputs of the multipliers 41 of the transversal filter 8. The filter design is such and the filter is so connected that it synthesizes the same transfer function as the first transversal filter 8, in other words the reciprocal transfer function of the transmission channel 1, ignoring the delay. Its input is connected to the output of the subtraction circuit 7, and receives the signal y"(t) available at the output of subtraction circuit 7 and very similar to the component y'(t) of the signal obtained at the output of the transmission channel 1, and corresponding to the useful signal y(t). The transversal filter 9 converts the signal y"(t) to a signal ŷ(t) of very similar form to the useful signal y(t), as it is produced by applying the latter signal to two circuits connected in series, namely the transmission channel 1 and the second transversal filter, with equal and opposite transfer functions. A digital-analogue converter 51 connected to the output of the transversal filter 9 provides the analogue form of the signal ŷ(t).

The self-adapting equaliser which has just been described can be used for digital transmission via telephone lines.

As a first example of the application of the invention to a useful signal with a frequency spectrum extending from 300 to 3400 Hz, the control signal x(t) is a bipolar signal with a cyclic ratio of 1/2 at a frequency of 4 kHz, so that the first lobe of its power spectrum is situated in the frequency band of the useful signal, the control signal having a length of 15 bits providing a range of frequencies covering the frequency band of the useful signal and separated by approximately 266.5 Hz. This control signal is transmitted at the same level as the useful signal. To obtain a separation ratio of 40 dB in filter circuit 6, n must be equal to $10^4$, the processing time for executing $10^4$ summations being $15 \cdot 1/40\text{-}00 \cdot 10^4 = 37.5$ seconds.

This computation time corresponds to $10^4$ consecutive read cycles of the shift registers 27 and 28 of filter circuit 6, during which the value of x"(t) is fixed. The time constant of the transmission channel must thus be greater than this value, which is most often the case.

The quality of the equalisation obtained depends on the number of frequencies of the control signal within the useful signal frequency band, which increases with the length of the pseudo-random bipolar sequence. On the other hand, the computation time of the filter circuit 6 varies inversely with the length of this sequence. It is therefore necessary to effect a compromise between the rate of convergence (fluctuation of transmission channel characteristics) and the quality of equalisation.

Like most known equalisers, the equiliser which has just been described operates in two stages: a learning stage during which only the control signal x(t) is sent over the transmission channel, and a transmission stage during which the useful signal y(t) is added to the control signal. The learning stage is used to synchronize the local control signal generator and to achieve rapid convergence in the transversal filter 8.

It will be understood that the present invention is not limited to the embodiment described hereinabove which may be modified in various ways without departing from the scope of the invention.

I claim:

1. A self-adapting equaliser for connection to the reception end of a transmission channel, said transmission channel receiving at the transmission end a useful signal y(t) and a control signal x(t) of period T superposed on the useful signal and of a form which is known at the reception end, the transmission channel supplying at the reception end a distorted signal with a component y'(t) corresponding to the useful signal y(t) and a component x'(t) corresponding to the control signal x(t), said equaliser being characterized in that it comprises:

a local generator supplying a control signal identical to the control signal x(t) applied to the transmission channel at the transmission end and received in the distorted form x'(t) mixed with the distorted form y'(t) of the useful signal, said control signal being synchronised with said signal x'(t);

a filter circuit receiving the signal y'(t)+x'(t) from the reception end of the transmission channel and providing at its output the mean value of this input signal and an integer number, (n−1) previous input signals sampled at intervals spaced by the period T of the control signal x(t);

a first non-recursive transversal filter comprising a cascade-connected impedance array with intermediate taps, with its input connected to receive the signal x"(t) provided by the filter circuit and having its weighting coefficients controlled so as to minimise the correlation functions of the signals at the intermediate taps and the signal which is the difference between its output signal $\hat{x}(t)$ and the control signal x(t) supplied by the local generator;

a subtractor circuit receiving on an additive first input signal y'(t)+x'(t) obtained at the reception end of the transmission channel and on a subtractive second input the signal x"(t) supplied by the filter circuit, and providing at its output a signal equal to the difference between the two signals applied to its inputs; and a second transversal filter with the same cascade-connected impedance array and the same weighting coefficients as the first transversal filter, receiving on its input the output signal of the subtractor circuit and providing at its output the equalised useful signal $\hat{y}(t)$.

2. An equaliser according to claim 1, wherein the said filter circuit is a digital filter circuit.

3. An equaliser according to claim 2, wherein the said filter circuit comprises two identical digital data processing circuits, each of said circuits comprising a shift register capable of storing a number of digital samples which is one greater than the number contained in a period T of the control signal x(t), and an adder circuit with a first input connected to the output of the shift register, a second input constituting that of the circuit, and an output connected to the input of the shift register and constituting the output of the circuit, the two data processing circuits operating alternately, one in write mode and one in read mode, the circuit in write mode receiving at its input the digital values of the signal samples obtained at the reception end of the transmission channel and the circuit in read mode receiving on its input a null value.

4. An equaliser according to claim 1, wherein the control signal x(t) generated in the local generator in synchronism with the signal x'(t) is applied to said first transversal filter via a delay circuit.

5. An equaliser according to claim 2, wherein the control signal x(t) generated in the local generator in synchronism with the signal x'(t) is applied to said first transversal filter via a delay circuit.

6. An equaliser according to claim 3, wherein the control signal x(t) generated in the local generator in synchronism with the signal x'(t) is applied to said first transversal filter via a delay circuit.

* * * * *